United States Patent Office 2,731,280
Patented Jan. 17, 1956

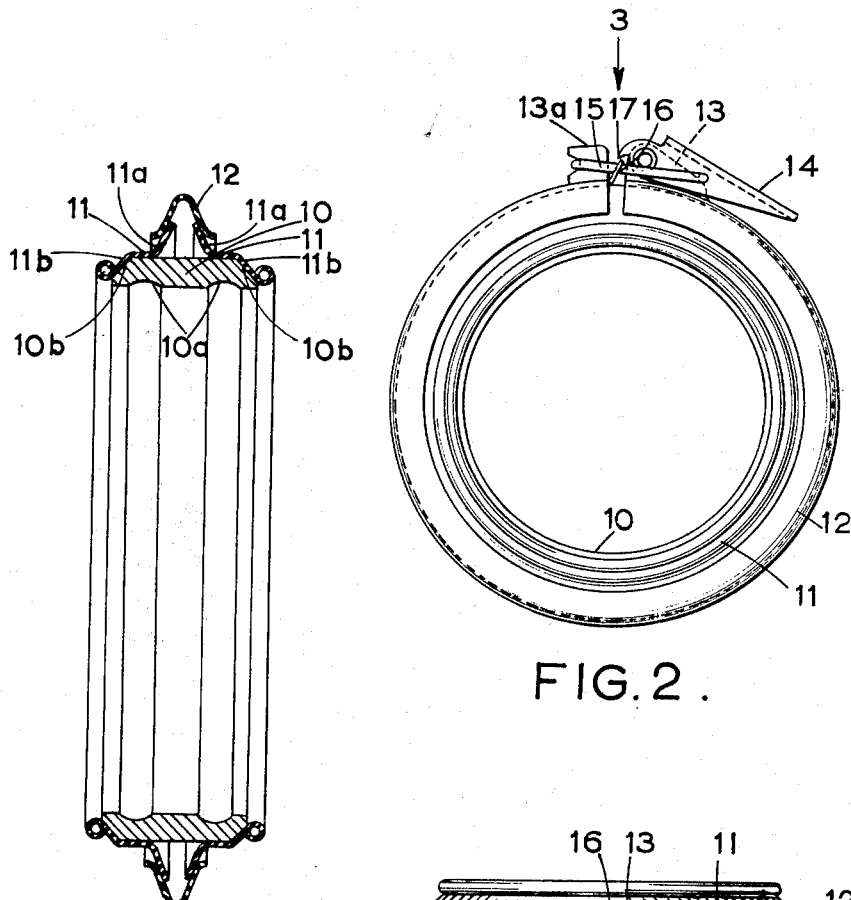
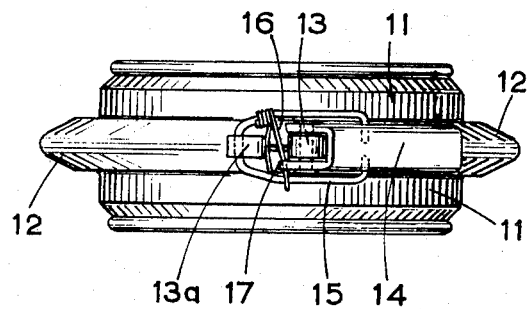

2,731,280
RESILIENT PIPE-CONNECTOR WITH MULTIPART CLAMP

Arthur Walter Goodliffe, Wimborne, and Peter Gerard Proctor, Bognor Regis, England, assignors to Flight Refuelling Limited, London, England, a British company Application July 10, 1953, Serial No. 367,126

Claims priority, application Great Britain July 22, 1952

4 Claims. (Cl. 285—129)

This invention relates to a lightweight pipe connector.

An object of this invention is the provision of improved means for connecting two pipe ends subjected to internal pressure, furnishing a good seal but of light-weight and able to be easily and quickly assembled and dismantled.

With this object, a connector according to the invention, comprises a sealing sleeve of rubber, or like yielding material, having a cylindrical inner surface in which are two preformed shallow, circumferential grooves, preferably of circular arc cross section, adapted to receive circumferential bulges of similar cross-section formed in the end portions of the pipes to be connected, the outer surface of the sealing sleeve being also cylindrical but with chamfered ends, a pair of similar retaining rings of sheet metal, each having an inclined, inwardly directed flange complementary to the chamfered ends of the sealing sleeve and an inclined outwardly directed flange, and a clamping ring also of sheet metal, of V-section for receiving the outwardly directed flanges of the retaining rings and drawing them together, the clamping ring being split and provided with means for drawing the split-ends together.

How this object and such others as may hereinafter appear are achieved will be more readily understood from the following description having reference to the accompanying drawings illustrating by way of example a specific embodiment of the invention the scope of which is not limited to what is hereinafter described and illustrated, but includes such modifications as may be within the competence of those skilled in the art, the scope of the invention being defined in the appended claims.

In the drawings,

Figure 1 is an axial section of the connector;

Figure 2 is an elevation viewed in the direction of the axis; and

Figure 3 is a detail view in the direction of arrow 3 of Figure 2.

The connector illustrated comprises a rubber sealing sleeve 10 with a cylindrical inner surface in which are preformed two shallow, circular arc section, circumferential grooves 10a, which receive the complementary circumferential bulges of the end portions of the pipes to be connected (not shown), and the outer surface of sleeve 10 is cylindrical with chamfered ends 10b. The connector also comprises two sheet metal retaining rings 11 having inwardly inclined flanges 11b complementary to the chamfered ends 10b of the sealing ring 10, and outwardly inclined flanges 11a receivable in a V-section, sheet metal clamping ring 12, which is split and provided with a notched lug 13a on one side of the split and a lug 13 on the other side of the split to which is pivoted a lever 14. A wire stirrup 15 is swingingly attached to lever 14 at a position nearer the extremity of the lever than the axis about which the lever is pivoted to lug 13, the stirrup 15 being engageable in the notch of lug 13a, so that by depressing the lever 14 towards the ring 12 the ends of the latter can be drawn together to draw the retaining rings 11 toward one another and thus clamp the sealing ring onto the end portions of the pipes to be joined. The inclined flanges 11b of the retaining rings 11 acting on the chamfered ends 10b of the sealing ring 10 co-operate with the pipe bulges acting on the grooves 10a of the sealing ring to set up a powerful wedging action on the end portions of the sealing ring ensuring an efficient seal and resisting the tendency of the pipes to separate under internal pressure.

It will be evident from Figure 2 that when the lever 14 is depressed towards the clamping ring 12 to tension the stirrup 15 lodged in the notch of lug 13a the stirrup passes over the dead-centre constituted by the pivot axis of lever 14 so that the tension in the stirrup tends to hold the lever down and force is required to raise the lever and release the clamping ring 12. Further, a locking device is provided consisting of a wire spring 16 wrapped round one leg of the stirrup 15 (see Figure 3) and having a free end extending across both legs thereof to engage a notched projection 17 formed on the lever 14, so as to prevent the lever from being raised past the dead-centre position by preventing the projection 17 from passing the stirrup 15. To release this locking device the wire spring 16 can be pressed towards the lug 13a to clear the projection 17. It will be observed that the upper face of the projection 17 is rounded, enabling it to spring the free end of the wire spring 16 out of its way when the lever 14 is moved towards the clamping ring 12 to tighten the latter.

We claim:

1. A lightweight pipe connector comprising a sealing sleeve of elastically deformable material having a cylindrical inner surface in which are preformed two shallow circumferential grooves of substantially arcuate cross-section adapted to receive circumferential bulges of similar cross-section formed in the pipe portions to be connected adjacent their ends, the outer surface of said sealing sleeve being cylindrical with chamfered ends, said respective ends occupying conical surfaces which converge outwardly of the sleeve, a pair of similar retaining rings, of sheet metal, each having at one margin an inclined inwardly directed flange, said flanges being complementary to the respective chamfered ends of said sealing sleeve and diverging radially inwardly of the sleeve, and each such ring having further at its opposite margin an outwardly directed flange inclined radially outwardly toward the corresponding flange of the other such ring, a split clamping ring of sheet metal, said clamping ring being of V-section adapted to engage over the inclined outwardly directed flanges of said retaining rings, and means for drawing together the ends of said clamping ring to contract the latter and cause it to exert a wedging action on the inclined outwardly directed flanges of said retaining rings to draw the latter towards one another.

2. A lightweight pipe connector as defined in claim 1, in which the means for contracting the clamping ring comprise a lug fixed on one end of said clamping ring, a lever pivoted on said lug about a fixed axis, a stirrup swingingly attached to said lever at a point nearer the extremity of the lever than the pivotal axis thereof, and a notched lug fixed on the other end of said clamping ring and engageable by said stirrup, the lever being movable towards said clamping ring beyond the dead-centre position in which said stirrup, when engaged with said notched lug, passes through the pivotal axis of said lever.

3. A lightweight pipe connector as defined in claim 2, including further a locking device comprising a wire spring attached to one side of said stirrup and having a free end extending across said stirrup and a projection extending from said lever to engage the free end of said wire spring and thereby prevent said lever from being moved away from said clamping ring past the mentioned dead-centre position, the free end of said wire spring being resiliently displaceable to clear said projection and allow said lever to be moved away from the clamping ring to release said stirrup from said notched lug.

4. A lightweight pipe connector as defined in claim 3, in which the upper face of said projection is rounded to enable it to spring the free end of said wire spring out of its way when the said lever is moved towards said clamping ring to tighten the latter.

References Cited in the file of this patent
UNITED STATES PATENTS 726,004     Stein                  Apr. 21, 1903